United States Patent Office 3,468,972
Patented Sept. 23, 1969

3,468,972
CONTROL OF BRANCHING AND COUPLING IN LITHIUM-TERMINATED POLYMERS
Henry L. Hsieh, Bartlesville, Okla., assignor to Phillips Petroleum Company, a corporation of Delaware
No Drawing. Filed June 22, 1964, Ser. No. 377,107
Int. Cl. C08d 5/02; C08g 30/00, 45/04
U.S. Cl. 260—836                          7 Claims

ABSTRACT OF THE DISCLOSURE

Coupling or branching between lithium-terminated polymers and a reactive organic coupling or branching agent is maximized by carrying out the reaction in a solution containing a compound having at least one ether, thioether, or tertiary amine linkage in sufficient amounts to color the solution. A coupling or branching agent is slowly added to the solution, color change of the solution is detected and, upon disappearance of the color from the solution, the addition of the agent is stopped.

---

This invention relates to a method of controlling the extent of branching or coupling in the reaction of lithium-terminated polymers with poly-functional reagents. In another aspect it relates to a method of obtaining maximum efficiency in reducing cold flow of an organolithium-catalyzed polymer by treatment with a polyfunctional coupling agent.

Many useful polymers can be made by polymerizing conjugated dienes and/or vinyl-substituted aromatic compounds with organolithium initiators. The versatility of these products is increased by the ability of the polymerizate to undergo coupling or branching reactions with polyfunctional organic compounds. Because of the nature of the polymerization mechanism, the polymers formed by these organolithium-initiated reactions contain lithium atoms on at least one end of the polymer molecule. It is known that these lithium-terminated polymers can be treated with reagents of various types to increase the molecular weight of the polymer by coupling reactions involving functional groups of the treating agent and the lithium atoms in the polymer. Reactions of this type are described in U.S. Patent 3,135,716 of Uraneck, Short and Zelinski and U.S. Patent 3,078,254 of Zelinski and Hsieh. As disclosed in this latter patent, the use of coupling reagents having three or more functional groups in reaction with polymers formed from organomonolithium initiators produces a branched or radial polymer. These polymers have very interesting properties and a particularly valuable application of this principle lies in treating rubbery polymerizates in order to reduce the tendency of the final product to cold flow in the unvulcanized state.

Whether it is desired to couple lithium-terminated polymers by reacion with difunctional treating agents or to obtain branched polymers with agents having three or more functional groups, the amount of functional treating agent must be correlated very closely to the functionality of the polymer in order to obtain the maximum effect desired. It has been described in the above-mentioned patent of Uraneck et al. that treating agents which react with the terminal lithium atoms in the polymer can either introduce functional groups into the polymer in place of the lithium atoms or couple the polymer molecules, depending upon the amount of treating agent used. This, of course, applies only to reagents which exhibit a multiple functionality in their reactions with the lithium-terminated polymer. Maximum coupling or branching is obtained by maintaining an exact stoichiometric relationship between the active lithium atoms in the polymer and the functional groups in the coupling agent. If less than a stoichiometric quantity is used, some of the polymer molecules remain unreacted and unaffected by the treatment. If more than a stoichiometric amount is used, the polymers are simply terminated with functional groups rather than coupled or, in the case of coupling agents having 3 or more functional groups, the polymers may be coupled rather than branched or cross-linked.

It might appear that it is a relatively simple matter to calculate the desired quantity of coupling agent from the known initiator charge. This is not a precise solution to the problem, however, because the polymerization system normally contains small amounts of catalyst poisons which inactivate some of the initiator used and/or terminate some of the polymer molecules before they can react with the coupling agent. Also, it is not always possible to make an exact determination of the functionality of the treating agent, that is, its concentration in terms of reactivity with carbon-lithium bonds.

I have now discovered a simple and accurate method of reacting lithium-terminated polymers with polyfunctional treating agents in order to produce a maximum or branching or coupling as the case may be. According to my invention, the reaction is carried out in the presence of a compound which contains at least one ether, thioether or tertiary amine linkage which causes a color development in the presence of compounds containing carbon-lithium bonds. The treating agent is then added slowly and the addition is stopped as soon as the color in the reaction mixture disappears. I have found that based on actual reactivities of the materials this is reliable evidence that a stoichiometric quantity of coupling agent has been introduced and that, accordingly, maximum coupling or branching has been obtained.

It is an object of my invention to provide a method of controlling the branching or coupling in the reaction of lithium-terminated polymers with polyfunctional compounds. Another object of my invention is to provide a method of treating a polymer of a conjugated diene prepared in an organolithium catalyzed system in order to obtain maximum reduction of cold flow of the recovered polymer. Another object is to provide a method of reacting lithium-terminated polymers with polyfunctional compounds in stoichiometric quantities. Other objects, advantages and features of this invention will be apparent to those skilled in the art from the following discussion.

The polymerization systems to which my invention applies are well known. The monomers which are polymerized are generally conjugated dienes having from 4 to 12 carbon atoms per molecule such as 1,3-butadiene, isoprene, piperylene, 2-phenyl-1,3-butadiene, 4,5-diethyl-1,3-octadiene, and the like. Vinyl-substituted aromatic compounds such as styrene, 1-vinylnaphthalene, 2-vinylnaphthalene, and the like, can also be polymerized in these systems as can various polar monomers such as esters of acrylic acid and esters of homologues of acrylic acid, for example methyl acrylate and methyl methacrylate. These monomers can be polymerized alone or with each other to form either block or random copolymers. The formation of random copolymers of this type is described in U.S. Patent 2,975,160 of Zelinski. In these systems randomizing agents are used which can also serve as the color producing agent for this invention.

Oganolithium polymerization initiators are a well-known class of compounds. These initiators can be either mono- or polyfunctional. Ordinarily the initiators are hydrocarbon except for the lithium atoms but functional groups which are inert with respect to the polymerization reaction can be present in the compound. The essential feature of these initiators is that they possess a carbon-lithium bond which acts as the point of initiation for the polymerization. The growth of the polymer is also propagated through the carbon-lithium bond which becomes a part of the polymer. Most commonly the initiators employed can be represented by the formula $RLi_x$ wherein $x$ is an integer of 1 to 4 and R is a hydrocarbon radical, either aliphatic, cycloaliphatic or aromatic, and containing up to about 30 carbon atoms per molecule. Examples of suitable initiators are n-butyllithium, n-amyllithium, 1,4-dilithiobutane, dilithionaphthalene, dilithium adducts of dimers, trimers and tetramers of conjugated dienes such as 1,3-butadiene and isoprene, and the like.

The polymerizations are carried out in a hydrocarbon reaction medium. A liquid hydrocarbon diluent such as n-pentane, n-hexane, isooctane, cyclohexane, toluene, benzene, xylene, and the like is suitable. The concentration of the initiator can be regulated to control molecular weight. Generally the initiator concentration is in the range of about 0.25 to 50 millimoles per 100 grams of monomer although both higher and lower initiator levels can be used if desired. The required initiator level frequently depends upon the solubility of the initiator in the hydrocarbon diluent. These polymerization reactions are usually carried out at a temperature in the range of −60 to +300° F. and at pressures which are sufficient to maintian the reaction mixture in the liquid phase.

At the conclusion of the polymerization and prior to quenching, the treating agent is added in order to couple the polymer. If the polymerization mixture does not contain the color-producing compound or if the treating agent itself does not contain an ether, thioether, or tertiary amine linkage, then a compound of this type must be added in an amount sufficient to produce color in the polymerization mixture. The amount of this color-producing material is not critical and an excess can be added if desired. Any of the ethers, thioethers or tertiary amines disclosed by Zelinski can be used, for example, diethyl ether, tetrahydrofuran, dimethylsulfide, tri-n-butylamine, and pyridine, to name a few. The color producing compound can be characterized as an ether, thioether, or tertiary amine, or it can be a compound of principally different character but having the required linkages, as for example polymers and resins which contain within their molecules a

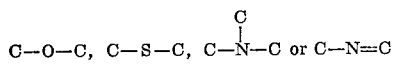

grouping. When such a compound is added or is present, the polymerization mixture has an intense color which remains as long as carbon-lithium bonds are present. When the polyfunctional treating agent is introduced, an immediate reaction occurs at the carbon-lithium bonds. By introducing this reagent slowly, the point at which substantially all of the carbon-lithium bonds have reacted is indicated by the disappearance of color. At this point very little if any excess treating agent is present and maximum branching and/or coupling has been achieved.

Polymerizations as described above using an organolithium initiator in a hydrocarbon medium provide solutions that are substantially colorless. If the system contains an ether, a thioether or a tertiary amine as in the case of the random copolymerization processes of Zelinski, the polymer solution is alrealy colored. This invention is applicable to either type of polymer solution. If the solution is colorless, a compound which contains at least one ether, thioether or tertiary amine linkage must be added. It is particularly advantageous, however, according to this invention to use in such a case a polyfunctional treating agent that contains at least one of the necessary groups or linkages that is responsible for color development. A separate compound added along with or prior to the introduction of the treating agent can, of course, be used but this has the disadvantage of introducing a material into the polymerization solution which is not incorporated into the polymer and may have to be removed from the solvent before the solvent can be reused.

Any polyfunctional agent which contains at least two reactive sites capable of reacting with the carbon-lithium bonds in the polymer can be used as the treating agent to produce polymer branching and/or coupling. Examples of types of compounds which can be used include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups, isocyanate and halide groups, and the like. Various other substituents which are inert in the treating reaction can be present such as hydrocarbon radicals as exemplified by the alkyl, cycloalkyl, aryl, aralkyl and alkaryl groups and the alkoxy, aryloxy, alkylthio, arylthio, and tertiary amino groups. Many suitable types of these polyfunctional compounds have been described in the above-mentioned patents of Uraneck et al. and Zelinski et al. Polyhalides such as methylene chloride, 1,4-dichlorobutane, silicon tetrahalides, di- and trihalosilanes, and other polyhalides as described by Zelinski et al. are suitable. Compounds named in this patent which contain an ether linkage can also be used both for coupling and for producing color in the polymer solution. The polyimines as exemplified by the triaziridinyl triazines described in U.S. Patent 3,097,193 and the aziridinyl phosphine oxides and sulfides described in U.S. Patent 3,074,917 can be used. Illustrative of other specific treating agents which can be employed are the following: 1,2: 5,6-diepoxyhexane, 1,2:5,69,10-triepoxydecane, 1,2:10,11 - diepoxy-4,8-dioxaundecane, epoxidized liquid polybutadiene, epoxy resins containing ether linkages such as the Kopox epoxy resins marketed by Koppers Company, Inc., benzene-1,4-diisocyanate, benzene-1,2,4-triisocyanate, 2 - (N,N-dimethylamino)benzene-1,4-diisocyanate, 3,5 - (di-n-butylthio)benzene-1,4-diisocyanate, tri(2-methyl-1-aziridinyl)phosphine oxide, 2,4,6-tri-(1-aziridinyl)-1,3,5-triazine, tri(2-phenoxy-1-aziridinyl)-phosphine oxide, 2,7-naphthalenedicarboxaldehyde, 3,6-dimethoxy-2,7 - naphthalenedicarboxaldehyde, 1,1,5-pentanetricarboxaldehyde, 1,3,6 - hexanetrione, pyromellitic dianhydride, styrene-maleic anhydride copolymer, glycerol tristearates, glycerol trioleates, silicon tetrachloride, trichloroethylsilane, 1,3,5-tri(bromoethyl)benzene, 1,3-dichloro-2-propanone, 1,2,4,5-diepoxy-3-pentanone, 1,2,6-7-diepoxy-8-thia-4-heptanone, and the like.

At the conclusion of the polymerization the polyfunctional treating agent is added in a small amount initially and the mixture is agitated to facilitate the reaction of the ingredients. Thereafter the agent is added continuously at a slow rate or in small increments with agitation being continued through the reaction period. The treating temperature can vary over a broad range and is conveniently the same as used for the polymerization. Temperatures in the range from about room temperature to 250° F. and particularly temperatures above 100° F. are preferred. Under such conditions the reaction normally occurs as soon as the materials are blended so that the time for the treatment is quite short and there is very little delay between the addition of the agent and the color change indicating stoichiometric reaction. In a continuous process the polymer solution can be passed through a reaction tube with coupling agent injected in increments along the length of the tube and the color change determined photoelectrically.

After the polyfunctional compound has been added, the polymer is recovered from solution by known means such as by quenching and coagulation with an alcohol or an acid or with aqueous solutions or mixtures of alcohol and acid and similar reagents. Conventional polymer recovery techniques are then employed. The polymers can be compounded and cured in the conventional manner to provide products useful as tire tread, gasket stock and many types of molded items.

In order to illustrate further advantages of my invention, the following examples are presented. In these examples the materials, conditions and proportions are typical only and should not be construed to limit my invention unduly.

EXAMPLE I

The following recipe was employed for the polymerization of butadiene in the presence of n-butyllithium:

| | |
|---|---|
| 1,3-butadiene, parts by weight | 100 |
| Toluene, parts by weight | 860 |
| n-Butyllithium, millimoles | 2.5 |
| Temperature, ° F. | 122 |
| Time, hours | 4 |
| Conversion, percent | 100 |

A series of runs was made. Variable quantities of a polyepoxy resin containing ether linkages (Kopox 997A, Koppers Company, Inc.) were employed to terminate several of the runs and one was terminated with epoxidized polybutadiene (Oxiron 2001, Food Machinery and Chemical Corporation), a material in which no ether linkages are present. A reaction occurred immediately upon contact of the polyepoxy compounds with the lithium-containing polymers. Along with each of the foregoing reactions a control was run that was terminated with isopropyl alcohol. Following addition of the terminating agents, the mixtures were agitated for two hours. The temperature was maintained at 122° F. during this period. The polymers were coagulated with isopropyl alcohol, separated, 0.5 part by weight per 100 parts polymer of the antioxidant, 2,2′-methylene-bis(4-methyl-6-tert-butylphenol) was added, and the products were dried. Cold flow, Mooney value (ML-4 at 212° F.), and inherent viscosity were determined. The runs are summarized in Table I:

TABLE I

| Run No.: | Terminating agent | Equivalent ratio, epoxide/Li | Cold flow, mg./min. | ML-4 at 212° F. | Inh. visc. | Color observation |
|---|---|---|---|---|---|---|
| 1 | Isopropyl alc | | | | 0.81 | Colorless. |
| 1A | Kopox 997A | 2/1 | 105 | 4 | 1.07 | Immediate change from yellow to colorless. |
| 2 | Isopropyl alc | | | | 0.87 | Colorless. |
| 2A | Kopox 997A | 1.33/1 | 23 | 13 | 1.28 | Immediate change from yellow to colorless. |
| 3 | Isopropyl alc | | | | 0.86 | Colorless. |
| 3A | Kopox 997A | 1.0/1 | 29 | 13 | 1.32 | Yellow to very light yellow. |
| 4 | Isopropyl alc | | | | 0.86 | Colorless. |
| 4A | Kopox 997A | 0.8/1 | 61 | 10 | 1.25 | Yellow. |
| 5 | Isopropyl alc | | | | 0.87 | Colorless. |
| 5A | Kopox 997A | 0.5/1 | 64 | 8 | 1.23 | Darker yellow than 4A. |
| 6 | Isopropyl alc | | | | 0.85 | Colorless. |
| 6A | Oxiron 2001 | 1.0/1 | 43 | 11 | 1.24 | No color developed. |

In all cases there was no color in any of the polymerization mixtures prior to addition of the terminating agent. No color developed in any of the control runs (those terminated with isopropyl alcohol). As can be seen from the data, a yellow color developed in all runs terminated with Kopox 997A but not with Oxiron 2001. In Run 2A it changed immediately to colorless and to a very light yellow in 3A. The cold flow in these two runs was the lowest in the series, indicating that maximum branching had occurred. The data demonstrate that there is a correlation between maximum branching and color change when a compound containing ether linkages is present.

Kopox 997A is a polyepoxy resin having a molecular weight of about 1270, an epoxide functionality of 5.4, an esterification equivalent weight of 90, a specific gravity (25° C./4° C.) of 1.19, a Durrans softening point of 99° C., an oxirane-oxygen content of 6.6–7.0 weight percent and a total chlorine content of 0.5 weight percent. The structural formula is

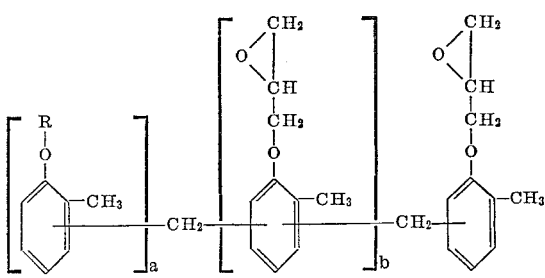

where $a$ is 1,6, $b$ is 4,4 and R is chlorohydrin, glycol or polymeric ether.

EXAMPLE II

A series of runs was made for the polymerization of butadiene using variable amounts of butyllithium as the initiator. Except for the initiator level, the recipe, polymerization temperature, and time were the same as described in Example I. The runs were terminated with Kopox 997A. In each run a small amount was added initially and a yellow color developed. The mixture was agitated while the remainder of terminating agent was introduced slowly until the color disappeared. At this point one equivalent, based on lithium, had been added. A control run terminated with isopropyl alcohol was made at each initiator level. The polymers were recovered as in Example I. Results are summarized in Table II.

TABLE II

| Run No. | BuLi level, mhm.(¹) | Terminating Agent | Inh. visc. | ML-4 at 212° F. | Cold flow, mg./min. |
|---|---|---|---|---|---|
| 1 | 1.2 | Isopropyl alc | 1.65 | ²10 | ²128 |
| 1A | 1.2 | Kopox 997A | 2.41 | 52 | 0.2 |
| 2 | 1.4 | Isopropyl alc | 1.41 | ²<5 | ²>170 |
| 2A | 1.4 | Kopox 997A | 2.10 | 39 | 0.3 |
| 3 | 1.6 | Isopropyl alc | 1.25 | | |
| 3A | 1.6 | Kopox 997A | 1.82 | 28 | 1.0 |
| 4 | 2.0 | Isopropyl alc | 1.02 | | |
| 4A | 2.0 | Kopox 997A | 1.51 | 18 | 9.1 |

(¹) Millimoles per 100 grams monomer.
(²) Values determined from a study of Mooney, inherent viscosity, and cold flow resulting from a series of runs for the polymerization of butadiene using variable amounts of butyllithium.

The data show that when operating to obtain maximum branching using the method of this invention, products wtih low cold flow in a relatively low Mooney range are readily obtained.

EXAMPLE III

Three butadiene/styrene block copolymers were prepared using butyl-lithium as the initiator and toluene as the diluent. When carrying out these runs, toluene was charged first after which the reactor was purged with nitrogen. Styrene was polymerized first, butadiene was added and polymerized, and the reactions were terminated with Kopox 997A using the procedure described in Example II. A yellow color developed upon addition of the first portion of the terminating agent and disappeared when one equivalent, based on lithium, had been added. The polymers were recovered as in Example I. The following recipe was used for preparing the polymers:

Initial charge:
  Styrene, parts by weight _____ Variable
  Toluene, parts by weight _____ 860
  n-Butyllithium, millimoles _____ Variable
  Temperature, ° F. _____ 122
  Time, hours _____ 1
Second charge:
  1,3-butadiene, parts by weight _____ Variable
  Temperature, ° F. _____ 122
  Time, hours _____ 3
Terminating reaction:
  Kopox 997A, equivalent _____ 1
  Temperature, ° F. _____ 122
  Time, hours _____ 1

Green tensile strength was determined on the raw polymers and gum tensile strength and elongation were determined on gum stocks. The following recipe was employed for compounding the gum stocks:

| | Parts by weight |
|---|---|
| Polymer | 100 |
| Zinc Oxide | 3 |
| Stearic acid | 2 |
| Sulfur | 1.75 |
| Santocure [1] | 1.5 |

[1] N-cyclohexyl-2-benzothiazolesulfenamide.

The stocks were cured 30 minutes at 307° F.

A summary of the results on the three polymers is presented in Table III.

TABLE III

| Run No.: | Bd/S wt. ratio | BuLi, mhm. | Green tensile, p.s.i. | Gum tensile, p.s.i. | Elongation, percent |
|---|---|---|---|---|---|
| 1 | 80/20 | 3.5 | 2,650 | 580 | 255 |
| 2 | 70/30 | 2.5 | 1,380 | 990 | 230 |
| 3 | 60/40 | 3.0 | 2,350 | 1,400 | 300 |

These data show the very high green and gum tensiles obtained. The relatively high initiator levels used ordinarily give low molecular weight polymers (liquid or semi-liquid). Using the process of this invention, maximum branching is obtained and the products are tough rubbers.

Tensile and elongation values were determined by ASTM D412–61T and Mooney values by ASTM D1646–61.

Inherent viscosity was determined as follows: one-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample (soluble portion).

Cold flow was measured by extruding the rubber through a ¼-inch orifice at a pressure of 3.5 p.s.i. and a temperature of 50° C. (122° F.). After allowing 10 minutes for the extrusion to reach a steady state, the rate of extrusion was measured and the values reported in milligrams per minute.

As will be apparent to those skilled in the art, various modifications can be made in this invention without departing from the spirit or scope thereof.

I claim:
1. In a process wherein a polymer solution formed by polymerizing at least one monomer selected from the group consisting of conjugated dienes and vinyl-substituted aromatic compounds with an organolithium polymerization initiator in a predominantly hydrocarbon solvent is treated prior to quenching with a polyfunctional reagent selected from the group consisting of polyepoxides, polyisocyanates, polyimines, polyaldehydes, polyketones, polyanhydrides, polyesters, and polyhalides, thereby coupling the polymer molecules with said reagent, the improvement which comprises adding said reagent slowly to said solution containing a compound which has within its molecule a member selected from the group consisting of ether, thioether, and tertiary amine linkages, said compound being present in sufficient amount to color said solution during the addition of said reagent, detecting any color change in said solution, and stopping the addition of said reagent to said solution in response to the disappearance of color from said solution.

2. The process of claim 1 wherein said monomer is 1,3-butadiene and said organolithium initiator is n-butyllithium.

3. The process of claim 1 wherein said color change is detected photoelectrically.

4. The process of claim 1 wherein said polymer solution is initially colorless and said compound is added to said solution.

5. The process of claim 4 wherein said polyfunctional reagent and said compound are identical.

6. The process of claim 5 wherein said monomer is 1,3-butadiene, said organolithium initiator is n-butyllithium and said reagent is a polyepoxide resin containing ether linkages.

7. In a process wherein a polymer of butadiene containing carbon-lithium bonds is reacted in solution with a polyepoxide compound that contains ether linkages, to couple said polymer and said polyepoxide compound, the improvement which comprises adding just sufficient of said polyepoxide compound to cause a disappearance of color in said solution.

References Cited

UNITED STATES PATENTS

| 3,078,254 | 2/1963 | Zelinski | 260—94.7 |
| 3,135,716 | 6/1964 | Zelinski et al. | 260—94.7 |
| 3,208,980 | 9/1965 | Gruver | 260—94.7 |
| 3,214,421 | 10/1965 | Mahan | 260—94.7 |
| 3,218,306 | 11/1965 | Hsieh | 260—94.7 |
| 3,251,812 | 5/1966 | Hsieh | 260—94.7 |

MURRAY TILLMAN, Primary Examiner

PAUL LIEBERMAN, Assistant Examiner

U.S. Cl. X.R.

260—77.5, 85.1, 94.7, 827, 837, 873, 880, 892